July 18, 1939.   P. M. CURRIER   2,166,801
DYNAMO-ELECTRIC MACHINE
Filed May 15, 1937

Inventor:
Philip M. Currier,
by Harry E. Dunham
His Attorney.

Patented July 18, 1939

2,166,801

UNITED STATES PATENT OFFICE 2,166,801

DYNAMO-ELECTRIC MACHINE

Philip M. Currier, Ballston Spa, N. Y., assignor to General Electric Company, a corporation of New York Application May 15, 1937, Serial No. 142,858

8 Claims. (Cl. 172—274)

My invention relates to dynamo-electric machines and more particularly to such machines operated from a source of current by means of electric discharge valves.

It is an object of my invention to provide an improved dynamo-electric machine arranged for operation from a source of unidirectional current impulses.

It is another object of my invention to provide an improved dynamo-electric machine operating from a source of current controlled by an electric valve converting system.

It is a still further object of my invention to provide an arrangement for operating a dynamo-electric machine from a source of alternating current by means of an electric valve converting system supplying unidirectional current impulses variable in frequency and which will be simple and reliable in operation.

Figure 1:
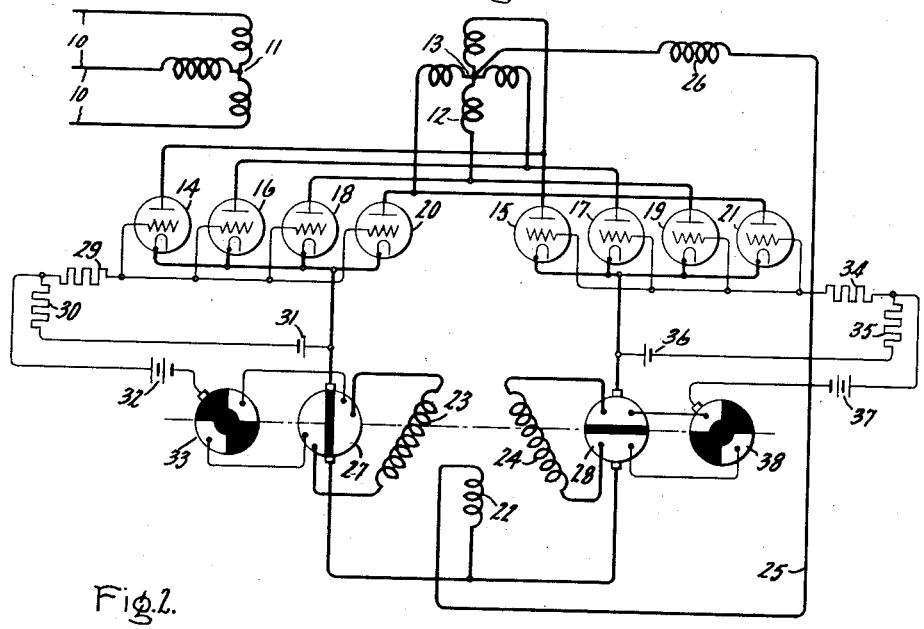
Figure 2:
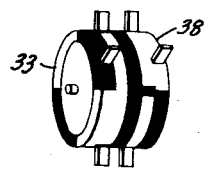
Figure 3:
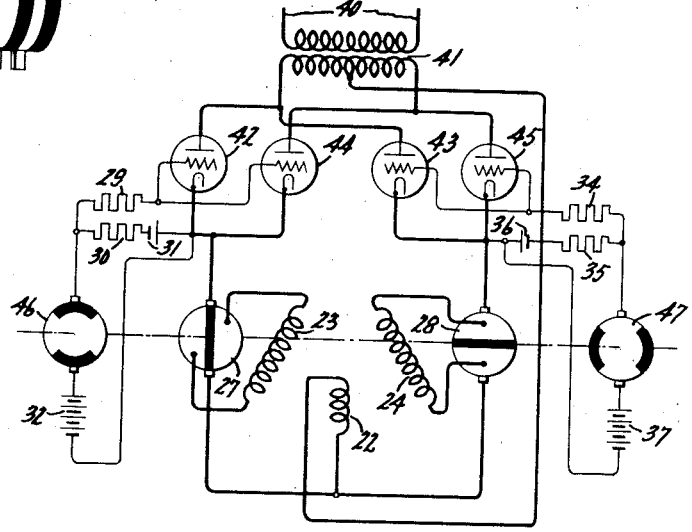

For a better understanding of this invention, together with further objects and advantages thereof, reference may be had to the following description taken in connection with the accompanying drawing in which Fig. 1 discloses a preferred embodiment of my invention, Fig. 2 the details of a switching device utilized in the arrangement shown in Fig. 1, and Fig. 3 is a modification of my invention.

Referring to Fig. 1 of the drawing, there is illustrated an alternating current source 10 for supplying current to an electric valve converting system having a T or Scott-connected primary transformer winding 11 and a star-connected two-phase secondary transformer winding 12 having a neutral point 13. Each of the terminals of the secondary transformer winding 12 is provided with a pair of electric valves 14, 15; 16, 17; 18, 19; and 20, 21. While for the purposes of simplicity in disclosure I have shown each of the valves 14 to 21 to be of the type comprising an anode, a cathode and a control grid enclosed in an envelope containing an ionizable medium, it of course will be understood that any other valve known in the art having an anode, a cathode and a control or starting electrode enclosed in an envelope containing an ionizable medium, may be utilized. The cathodes of the valves 14, 16, 18 and 20 are tied together and the cathodes of the valves 15, 17, 19 and 21 are tied together. The cathodes of these two groups of valves are connected to supply current to a dynamo-electric machine having a field winding 22 and a plurality of armature phase windings 23 and 24. For the purposes of simplicity in disclosure the dynamo-electric machine is shown as having but two armature phase windings although it will be apparent to those skilled in the art that similarly arranged dynamo-electric machines may be utilized which have a greater number of armature phase windings. The field winding 22 is connected between the armature phase windings 23 and 24 and the neutral point 13 of the transformer network 12 by means of a conductor 25 and an inductive winding 26 which winding operates to prevent undesirable interaction between the electric valve converting system and the dynamo-electric machine. The terminals of the armature phase winding 23 are each connected to one of the conductive segments of a switching device 27 which comprises two conductive segments, an insulated segment and two brushes, one of which is connected to the cathodes of one group of electric valves and the other of which is connected to one terminal of the field winding 22. The armature phase winding 24 is arranged to have its terminals connected to the conductive segments of a switching device 28 which comprises two conductive segments, an insulating segment and a pair of brushes, one of which is connected to the other group of electric valves, the other of which is connected to the field winding 22. The switching devices 27 and 28 which are mounted upon the shaft of the dynamo-electric machine are so arranged that the insulating or nonconductive segments separating the two conductive segments of substantially 180° each, are at an angle of 90° to each other. In the position shown in the drawing the connections to the armature phase windings 23 are being reversed by the switching means 27 whereas the armature phase winding 24 is connected to the switching device 28, the brushes of which are in the middle of the conductive segment.

The control grids of the electric valves 14, 16, 18 and 20 are connected together in a single control circuit which includes the current limiting or protective resistors 29 and 30 and a negative biasing potential 31. In parallel to that portion of the grid circuit comprising the protective resistor 30 and the biasing source 31 there is connected to positive source of potential 32 and a switching means 33 which means operate to cause a positive potential 32 to be impressed upon the control circuit thereby overcoming the effect of the normally negative bias potential 31. The switching member 33 comprises two conductive segments of substantially 90° and a single brush which is connected to one terminal of the positive potential source 32. Each of the conductive segments of the switching device 33 is connected to a different conductive segment of the switching device 27. The brush of the switching device 33 is so arranged relative to the brush of the switching device 27 which is connected to the cathodes of these valves so that the tubes are rendered conductive approximately 45° after the brush of the switching means 27 first made contact with its conductive segment. All of the control members or grids of the valves 15, 17, 19 and 21 are connected together to a single control circuit including the protective resistors 34, 35 and the source of negative biasing potential 36. A similar source of positive potential 37 is arranged to be periodically connected to these control grids by means of a switching device 38 which operates in a manner similar to the switching device 33. In Fig. 2 there is shown a perspective view of the manner in which the switching devices 27, 28, 33, and 38 may be combined in a single structure for mounting at one end of the dynamo-electric machine shaft.

In operation each of the electric valves 14 to 21 is conductive for a period of 90 electrical degrees during the half cycle of alternating current during which the anode is at a positive potential. It will be assumed that each of the armature coils has current flowing therethrough in one direction for 90 electrical degrees of travel, then 90 electrical degrees elapse; whereupon current flows in the other direction for 90 electrical degrees which again is followed by a 90 electrical degree interval of inactivity. Since the armature windings shown are so arranged as to be 90° apart, it will be apparent that current first travels through one of the armature windings and is then transferred to the other armature winding. Thus, during the starting operation it will be apparent that the period during which current is flowing, for instance, in the armature winding 24 which as shown in the drawing is in a conductive condition, it may be necessary for several of the electric valves in the group 15, 17, 19 and 21 to become conductive in succession. If it is assumed that the upper terminal of the transformer winding 12 was positive at the time that the brush of the control circuit connected to the switching device 38 first made contact with its conductive segment the valve 14, therefore, became conductive. If the speed of the motor is so low that the conductive armature winding requires further impulses of current during its normal period of conductivity, it may be assumed that with a clockwise phase rotation on the transformer 12 the valve 17 also supplies current, and if necessary also the valves 19 and 21 in proper sequence. For the next 90 electrical degrees of travel of the motor armature current is supplied by the required number of valves of the group 14, 16, 18 and 20. When the motor has attained its normal operating speed it may be assumed that sufficient current is supplied for each working period of the armature winding so that only a single electrical valve need supply current during that period. Thus, it also will be apparent that the current flow reverses through each of the armature windings and that each of the windings carries current for 90 electrical degrees of travel. Since the field winding 22 is connected in series with the armature windings 23 and 24 it will be apparent that the current through the field winding 22 is unidirectional and substantially continuous. It will also be apparent that, while each of the armature windings is arranged by means of their respective switching devices 27 and 28 to be in a position for conducting current for nearly 180 electrical degrees, current flows therethrough only for a period of substantially 90 electrical degrees and hence the switching devices 27 and 28 do not operate to interrupt current. The valves do not supply current to these windings until approximately 45 electrical degrees of travel have occurred since the change in connections was made.

In the arrangement shown in Fig. 3 a source of single phase alternating current 40 supplies energy to a transformer 41 having a secondary winding which is provided with an intermediate or midtap connection thereon. Each of the extremities of the secondary winding of the transformer 41 is provided with a pair of electric valves 42, 43, and 44, 45, respectively. These electric valves supply unidirectional current impulses to a dynamo-electric machine which is similar to that disclosed in Fig. 1 and the parts of which have been given similar reference characters. The control circuit for the electric valves 42 to 45 are also similar to the control circuit of the valves shown in Fig. 1 and corresponding parts have been given similar reference characters. The individual grid circuits, however, are controlled through switching means 46 and 47, respectively, which are somewhat different than that disclosed in Fig. 1. While somewhat different in physical structure, their electrical operation is substantially the same and hence it is believed that no further explanation of their operation need be given. Under some circumstances, however, it may be found desirable to make one of the conductive sectors slightly less than 90 electrical degrees so that the current flow through these sectors will always be interrupted by the same sector thereby causing any wear or spotting of the segment to occur in the same place. By making one of the sectors slightly less than 90 electrical degrees it will be found that this also aids in insuring proper clean-up or deionization action of the valves during their nonconductive periods. If the sectors of the switching devices 46 and 47 are such that one of them is slightly less than 90 electrical degrees it may be desirable to provide an auxiliary brush for starting purposes, which brush may be shifted to effectively lengthen the conductive segment. Such an arrangement is described and claimed in U. S. Letters Patent No. 2,034,524 of A. H. Mittag for Electric valve converting system and excitation apparatus therefor, which is assigned to the same assignee as the present application.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The combination comprising a source of current, a dynamo-electric machine including a plurality of armature phase windings each provided with a switching device for periodically reversing the connections thereto in accordance with the speed of said machine, a plurality of controlled electric valves for transmitting unidirectional current impulses from said source to said machine, and means for controlling the conductivities of said valves in accordance with the speed of said machine.

2. The combination comprising a source of current, a dynamo-electric machine including a plurality of armature phase windings each provided with a switching device for periodically reversing the connections thereto, said switching devices being mounted upon the shaft of said machine, a plurality of controlled electric valves for transmitting unidirectional current impulses from said source to said machine, and means for controlling the conductivities of said valves in accordance with the speed of said machine.

3. The combination comprising a source of current, a dynamo-electric machine provided with a field winding and a plurality of armature phase windings, a plurality of controlled electric valves for transmitting unidirectional current impulses from said source to said machine, a switching device for each of said armature phase windings for reversing the connections thereto in accordance with the speed of said machine whereby the direction of current therethrough is reversed, means for causing unidirectional current flow of said impulses through said field winding, and means for controlling the conductivities of said valves in accordance with the speed of said machine.

4. The combination comprising a source of alternating current, a dynamo-electric machine provided with a field winding and a plurality of armature phase windings, a plurality of controlled electric valves for transmitting unidirectional current impulses from said source to said machine, a switching device for each of said armature phase windings for periodically reversing the connections thereto whereby the direction of current therethrough is reversed, means connecting said field winding in series with said armature phase winding and for causing unidirectional current flow through said field winding, and means mounted on the shaft of said machine for controlling the conductivities of said valves.

5. The combination comprising a source of alternating current, an inductive winding energized from said source of alternating current, a dynamo-electric machine provided with a field winding and a plurality of armature windings, a pair of controlled electric valves connected to each terminal of said inductive winding for transmitting unidirectional current impulses to said machine, a switching device for each of said armature windings for periodically reversing the connections thereto, said switching devices being mounted on the shaft of said machine, and means for controlling the conductivities of said valves in accordance with the speed of said machine.

6. The combination comprising a source of current, a dynamo-electric machine provided with a field winding and a plurality of armature windings, a group of controlled electric valves for each of said armature windings for transmitting unidirectional current impulses from said source to said machine, a switching device for each of said armature windings for periodically reversing the connections thereto during the nonconductive period of the associated valve groups, means for supplying unidirectional current to said field winding, and means for controlling the conductivities of said valve groups in accordance with the speed of said machine.

7. The combination comprising a source of current, a dynamo-electric machine including a field current winding connected in series with a plurality of armature phase windings, each armature phase winding being provided with a switching device for periodically reversing the connections thereto whereby the direction of current flow therethrough is reversed, said switching devices being mounted upon the shaft of said machine, a plurality of controlled electric valves for each of said armature phase windings for transmitting unidirectional current impulses from said source to said machine, and means for controlling the conductivities of said valves in accordance with the speed of said machine so that each armature phase winding carries current during half of its operating time.

8. The combination comprising a polyphase source of alternating current including a plurality of inductive windings having a neutral connection, a dynamo-electric machine provided with a field winding and a plurality of armature phase windings, a pair of controlled electric valves for each terminal of said alternating current inductive windings for transmitting unidirectional current impulses from said source to said machine, means connecting said field winding between the neutral point of said inductive windings and said armature phase windings, switching means for each of said armature windings for periodically reversing the direction of current flow therethough, and means for controlling the conductivities of said valves.

PHILIP M. CURRIER.